United States Patent [19]

Ohtsuka et al.

[11] Patent Number: 4,977,992
[45] Date of Patent: Dec. 18, 1990

[54] AUTOMATIC TRANSMISSION SYSTEM FOR VEHICLES

[75] Inventors: Masuhiro Ohtsuka; Yuji Satoh; Hiromi Kono, all of Higashimatsuyama, Japan

[73] Assignee: Diesel Kiki Co., Ltd., Japan

[21] Appl. No.: 412,682

[22] Filed: Sep. 26, 1989

[30] Foreign Application Priority Data

Sep. 30, 1988 [JP] Japan .................. 63-244275

[51] Int. Cl.[5] ........................................... B60K 41/28
[52] U.S. Cl. ................................. 192/0.073; 74/866; 74/877; 364/424.1
[58] Field of Search ................. 192/0.073, 0.092, 3.55, 192/3.61, 103 R, 103 C; 74/866, 877, 878; 364/424.1

[56] References Cited

U.S. PATENT DOCUMENTS

| | | | |
|---|---|---|---|
| 4,350,057 | 9/1982 | Kishi et al. | 74/866 |
| 4,591,038 | 5/1986 | Asagi et al. | 192/0.073 |
| 4,635,508 | 1/1987 | Tatsumi | 74/866 |
| 4,638,690 | 1/1987 | Hattori et al. | 74/866 |
| 4,643,048 | 2/1987 | Hattori et al. | 74/866 |
| 4,718,309 | 1/1988 | Moriya | 74/866 |
| 4,823,643 | 4/1989 | Koshizawa | 74/866 |

FOREIGN PATENT DOCUMENTS 59-151655  8/1984  Japan .

*Primary Examiner*—Richard Lorence
*Attorney, Agent, or Firm*—Pollock, Vande Sande & Priddy

[57] ABSTRACT

In an electronically controlled automatic transmission system including a gear transmission and a clutch, in which a target gear position is determined in accordance with map data for gear-shift control, it is discriminated whether or not the vehicle is in accelerating condition and necessary control for shifting up the transmission to the target gear position is carried out only when the vehicle is not in the accelerating state. Thus, when the driver presses hard on an accelerating member to accelerate the vehicle, a series operations for shifting up is not carried out, whereby the transmission is kept in its present gear position. The operation for shifting up can be carried out after the completion of the acceleration of the vehicle.

6 Claims, 3 Drawing Sheets

AUTOMATIC TRANSMISSION SYSTEM FOR VEHICLES

BACKGROUND OF THE INVENTION

The present invention relates to an automatic transmission system for vehicles, and more particularly to a system for controlling a vehicle transmission apparatus including a friction type clutch and a gear type transmission in accordance with the operation condition of the associated vehicle to perform an automatic gearshift operation.

In general, the conventional automatic transmission system of the type described above uses map data for gear-shift control for determining a suitable gear position for the operation condition of the vehicle at each moment, and the operation for shifting the transmission to the determined suitable gear position is automatically performed (Japanese Patent Application Public Disclosure No. 59-151655 (151655/84)). Since the map data is adapted to determine the suitable gear position for the vehicle operation at that time on the basis of the amount of operation of the accelerator pedal and the vehicle speed, the transmission will be successively shifted up with increase in the vehicle speed when, for example, the driver fully depresses the accelerator pedal to accelerate the vehicle. In this case it follows that the clutch is disengaged at each operation for shifting-up while the vehicle is being accelerated. Accordingly, the driver from time to time experiences a feeling of deceleration in the course of the acceleration of the vehicle caused by his depression of the accelerator pedal, and this will cause incompatibility between what the driver expected in response to his operation and what he actually experienced.

SUMMARY OF THE INVENTION

An object of the present invention is to provide an improved automatic transmission system for vehicles, which is able to eliminate the above-described disadvantages of the prior art.

Another object of the present invention is to provide an automatic transmission system for vehicles which is capable of effectively accelerating the vehicle.

A further object of the present invention is to provide an automatic transmission system for vehicles in which the operation for shifting-up the transmission is controlled in response to the operation of an accelerating member.

According to the present invention, in a system for controlling operations of a gear type transmission and a clutch forming a transmission apparatus for vehicles to perform an automatic gear-shifting operation, the system comprises a determining means for determining a target gear position on the basis of at least the amount of the operation of an accelerating member and the speed of the vehicle associated with the transmission apparatus in accordance with the map data for gear-shift control. The system further comprises an acceleration discriminating means for discriminating whether or not the vehicle is in accelerating condition, and a controlling means which is responsive to the determining means and the acceleration discriminating means and enables provision of a set of necessary control signals for shifting up the transmission to the target gear position only when the vehicle is not in the accelerating state, whereby the transmission and the clutch are controlled in accordance with the control signals to automatically carry out the necessary operation for shifting up to the target gear position.

With this system according to the present invention, in the case where for example, the driver presses hard on the accelerating member to accelerate the vehicle, when the accelerating condition of the vehicle is discriminated by the acceleration discriminating means, a series of operations for shifting up is not carried because no control signals are output from the controlling means, whereby the transmission is kept in its present gear position. The operation for shifting up can be carried out after the completion of the acceleration of the vehicle.

Thus, since the operation for shifting up is inhibited during acceleration of the vehicle even if the conditions for a gear shift up operation are established, the clutch is not disengaged during acceleration of the vehicle, whereby vehicle deceleration because of a gear-shift up operation does not occur. As a result, the driver will experience the acceleration feeling he expects from his operation.

Furthermore, it can be discriminated from the operation condition of an accelerating member whether or not the driver has an intention to accelerate the vehicle, and the resulting discrimination may be further can be used for deciding whether or not the control operation for shifting up should be inhibited.

The invention will be better understood and other objects and advantages thereof will be more apparent from the following detailed description of preferred embodiments with reference to the accompanying drawings.

DESCRIPTION OF THE PREFERRED EMBODIMENT

Figure 1:
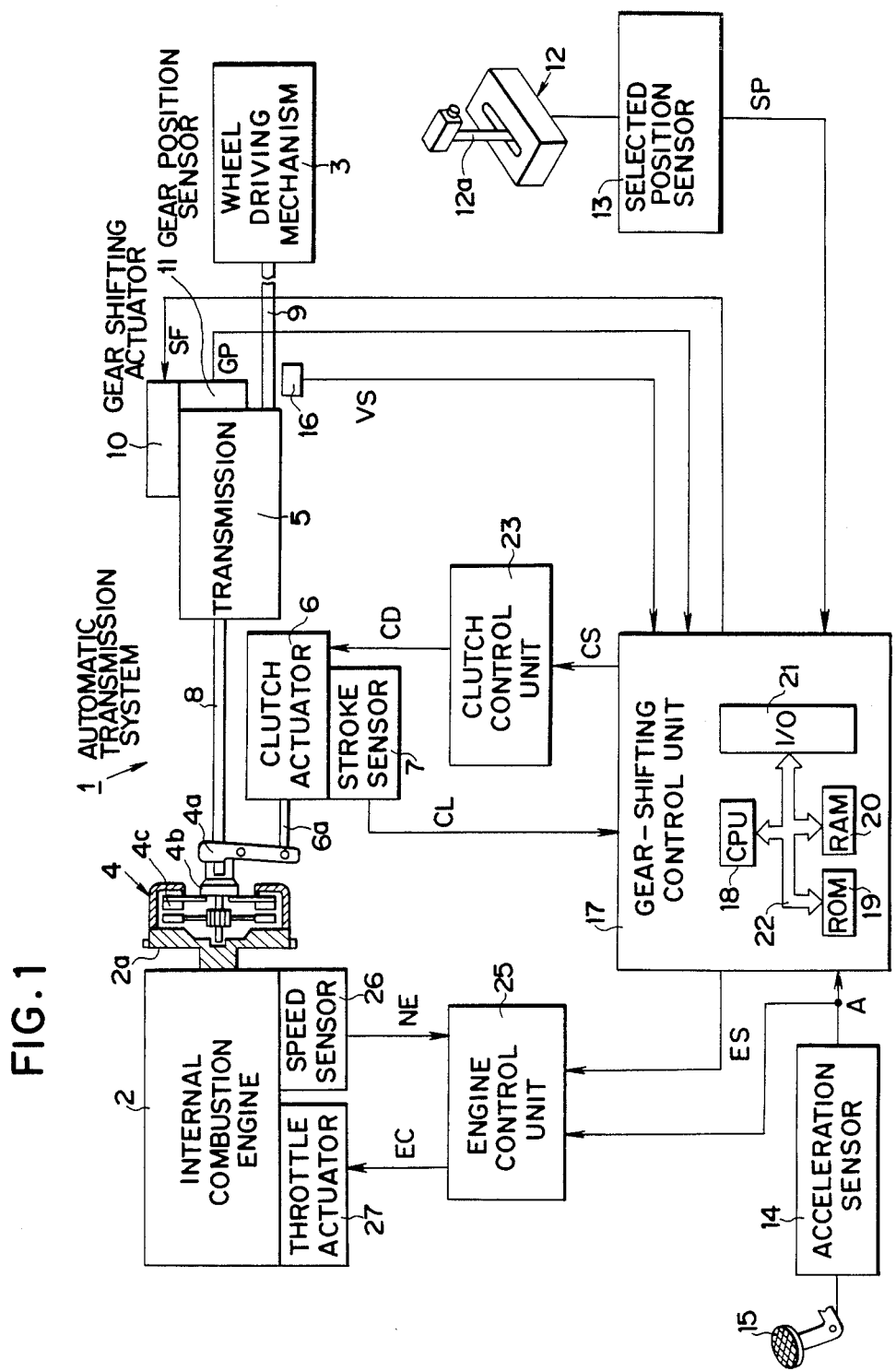
FIG. 1 is a view schematically showing an embodiment of an automatic transmission system for vehicles according to the present invention.

In FIG. 1, an embodiment of an automatic transmission system for vehicles according to the present invention is illustrated in schematic form. Reference numeral 1 generally designates an automatic transmission system for a vehicle (not shown) powered by an internal combustion engine 2 and the automatic transmission system 1 comprises a friction clutch 4 mounted on an engine flywheel 2a and a gear type synchromesh transmission 5. In this embodiment, the friction clutch 4 is a well-known dry-type single-disc clutch having a clutch release lever 4a and a clutch release bearing 4b. In order to control the engaging/disengaging (ON/OFF) operation of the clutch 4, there is provided a clutch actuator 6 having a piston rod 6a connected to the clutch release lever 4a for actuating the clutch release lever 4a. The clutch actuator 6 is provided with a stroke sensor 7 for detecting the position of a pressure plate 4c of the clutch 4 and a clutch signal CL indicating the position of the pressure plate 4c is produced by the stroke sensor 7. The clutch 4 is connected by a connecting rod 8 with the transmission 5, and the rotational output of the transmission 5 is transmitted through a propeller shaft 9 to a wheel driving mechanism 3 of the vehicle.

The transmission 5 is actuated by a gear shifting actuator 10 associated therewith, and the gear position set in the transmission 5 is detected by a gear position sensor 11 associated with the transmission 5 to produce a gear position signal GP showing the actual gear position set in the gear transmission 5.

The vehicle has a selector 12 with a selecting lever 12a that is manipulated by the driver to select one position from among a plurality of positions which may include, e.g., an "N" position (neutral), a "1" position (1st gear), a "2" position (2nd gear), a "D" position (automatic gear changing position), and an "R" position (reverse gear). That is, the driver manipulates the selecting lever 12a in order to select a desired control mode for the transmission 5. The selecting lever 12a is coupled with a selected position sensor 13 for producing a selected position signal SP showing the position of the selecting lever 12a.

An acceleration sensor 14 is associated with an accelerator pedal 15 and produces an acceleration signal A showing the amount of operation of the accelerator pedal 15. Reference numeral 16 indicates a known vehicle speed sensor mounted on the propeller shaft 9 for producing a vehicle speed signal VS showing the running speed of the vehicle powered by the engine 2.

The clutch signal CL, the gear position signal GP, the selected position signal SP, the acceleration signal A and the vehicle speed signal VS, which represent operating parameters of the vehicle, are applied to a gear-shifting control unit 17 including a central processing unit (CPU) 18, read-only memory (ROM) 19, random access memory (RAM) 20 and I/O interface 21, which are interconnected by a bus 22 to form a microcomputer. The input signals CL, GP, SP, A and VS are converted into digital form in the I/O interface 21 to obtain clutch data DL, gear position data DG, selected position data DS, acceleration data DA and vehicle speed data DV, respectively. These data DL, DG, DS, DA and DV are processed in accordance with a control program (which will be described later) stored in advance in the ROM 19 to produce a shift control signal SF, a clutch control signal CS and an engine control signal ES, which serve to shift the gear of the transmission 5 into the gear position determined by the computation carried out in the CPU 18.

The shift control signal SF is applied to the gear shifting actuator 10 for controlling the gear shifting actuator 10 so as to shift the gear of the transmission 5 into the determined gear position, while the clutch control signal CS is applied to a clutch control unit 23 for producing a clutch driving signal CD in response to the clutch control signal CS for commanding the engagement or disengagement of the clutch 4. The clutch driving signal CD drives the clutch actuator 6 so as to engage or disengage the clutch 4.

The level of the engine control signal ES changes to high from low at the time of the start of the control operation for gear-changing in the gear-shifting control unit 17, and the level of the signal ES changes to low from high at the time of the termination of the control operation for gear-changing in the gear-shifting control unit 17.

The engine control signal ES is supplied to an engine control unit 25 which receives the acceleration signal A, the clutch signal CL, and an engine speed signal NE output by a known speed sensor 26 associated with the internal combustion engine 2 and indicating the rotational speed of the internal combustion engine 2.

The engine control unit 25 functions to regulate the engine speed based on the manipulation of the accelerator pedal 15. Namely, the engine control unit 25 is responsive to the acceleration signal A to produce an engine speed control signal EC, which is applied to a throttle actuator 27 for controlling the fuel supply to the engine 2. Thus, the throttle actuator 27 is actuated by the engine speed control signal EC in accordance with the amount of operation of the accelerator pedal 15 and the engine speed can be regulated in accordance with the manipulation of the accelerator pedal 15. The above-described operation is performed in the engine control unit 25 only when the level of the engine control signal ES is low.

When a high level engine control signal ES is applied to the engine control unit 25, the engine control unit 25 functions to maintain the engine speed at its idling speed in response to the engine speed signal NE. Accordingly the high level engine control signal ES is supplied to the engine control unit 25 when the clutch 4 is in the disengaged state during the gear shift operation, whereby it is possible to suppress excessive increase in engine speed while the clutch is disengaged for shifting the gears.

According to the control program stored in the ROM 19, the shift control signal SF and the clutch control signal CS can be produced as a set of control signals from the gear-shifting control unit 17 for automatically shifting the gear position of the transmission 5 to the suitable position for the operation condition of the vehicle when requested, and the transmission 5 and the clutch 4 are controlled in the usual manner by means of the gear shifting actuator 10 and the clutch actuator 6 in response to the signals SF and CS, respectively. Furthermore, it is discriminated whether or not the vehicle is now accelerating, and the control operation for shifting up the transmission 5 is inhibited during the time the vehicle is being accelerated.

The control program will be now be described in more detail.

Figure 2A:
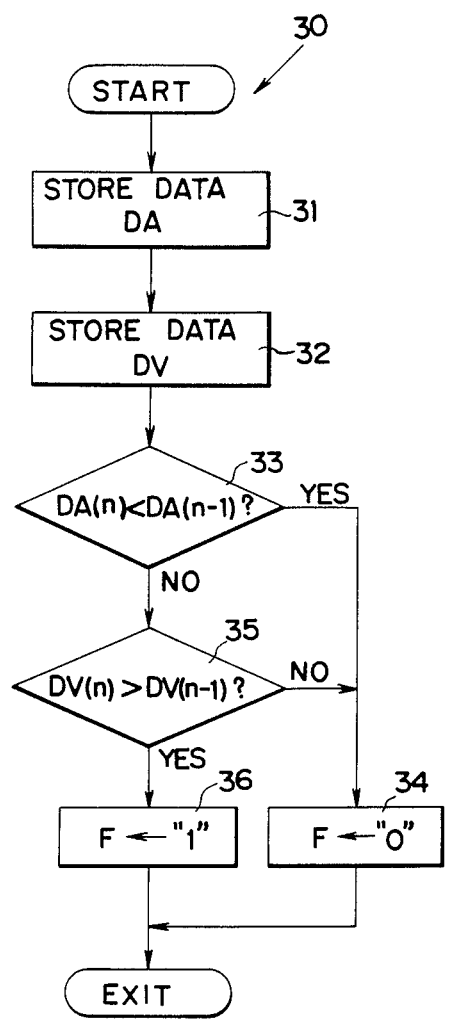
FIGS. 2A and 2B are flowcharts showing first and second control programs, respectively, which are executed in the micro-computer system shown in FIG. 1.
Figure 2B:
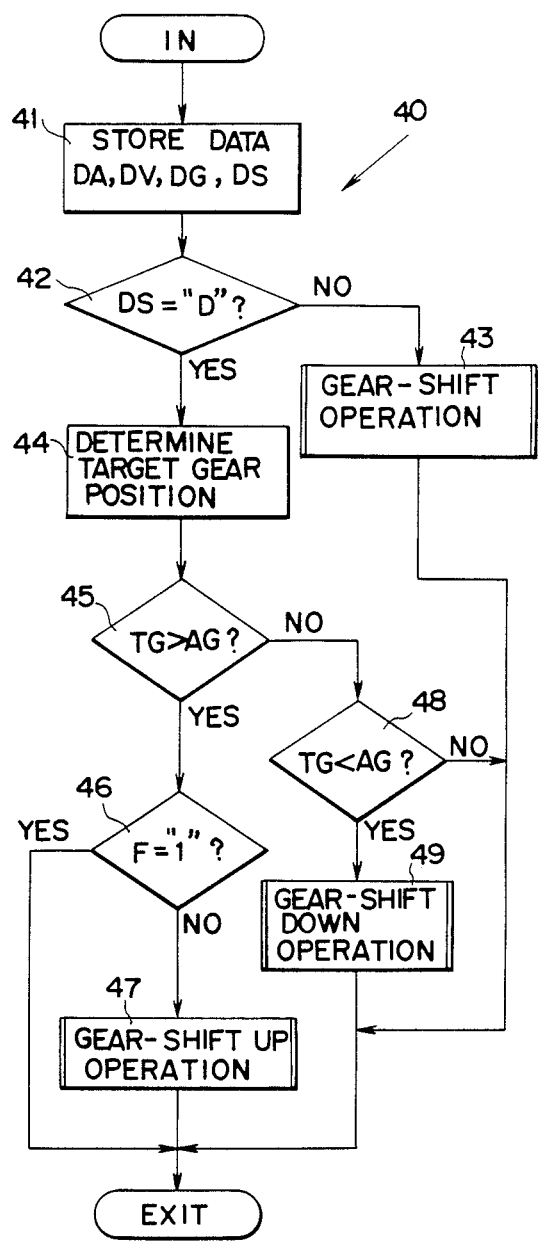

In FIG. 2A, reference numeral 30 designates a first control program which is executed at regular intervals, for example, at every 200 (ms), and in FIG. 2B, reference numeral 40 designates a second control program which is repeatedly executed as appropriate.

At first, an explanation of the first control program 30 will be given. When the execution of the first control program 30 starts, the operation moves to step 31 wherein the acceleration data DA showing the amount of operation of the accelerator pedal 15 at that time is stored in the RAM 20. After this, the operation moves to step 32 wherein the vehicle speed data DV showing the vehicle speed at that time is stored in the RAM 20.

In step 33, in order to discriminate whether or not the amount of operation of the accelerator pedal 15 is changed so as to decrease the amount of depression, in other words, whether or not the depression of the accelerator pedal 15 is reduced, acceleration data DA(n) obtained in step 31 in this program cycle is compared with the acceleration data DA(n−1) which was obtained in the preceding program cycle and is stored in the RAM 20. DA(n) is smaller than DA(n−1) when the accelerator pedal 15 is manipulated so as to decelerate the vehicle, so that the determination in step 33 becomes YES. In this case, the operation moves to step 34 wherein a flag F is cleared, and the execution of the first control program 30 is completed. On the other hand, DA(n) becomes equal to or larger than DA(n−1) when the depression of the accelerator pedal 15 is not reduced, that is, the manipulation of the accelerator pedal 15 for decelerating the vehicle is not being performed, so that the determination is step 33 becomes NO. In this case, the operation moves to step 35 wherein discrimination is made as to whether or not the vehicle speed is being increased, in other words, whether or not the vehicle is being accelerated. This discrimination is made by comparing vehicle speed data DV(n) obtained in step 32 executed in this program cycle and vehicle speed data DV(n−1) which wa obtained in step 32 executed in the preceding program cycle, and is stored in the RAM 20.

In the case where the vehicle is being accelerated, since the vehicle speed is increasing, DV(n) becomes larger than DV(n−1). When DV(n)>DV(n−1), the determination in step 35 becomes YES and the operation moves to step 36 wherein the flag F is set. Thus, the execution of the first control program 30 is completed.

In the case where the vehicle is being decelerated, since the vehicle speed is decreasing, DV(n) becomes smaller than DV(n−1). When DV(n)≦DV(n−1), the determination in step 35 becomes NO and the operation moves to step 34 wherein the flag F is cleared.

As described above, according to the first control program 30, the flag F is set only when the vehicle speed is increasing in the case where the depression of the accelerator pedal 15 is not reduced, whereby the gear-shift up operation is inhibited at gear-shift controlling according to the second control program 40.

When the execution of the second control program 40 starts, step 41 is executed at first, wherein the acceleration data DA, the vehicle speed data DV, the gear position data DG showing the gear shift position of the transmission 5 at that time and the selected position data DS showing the position selected by the selecting lever 12a of the selector 12 at that time are stored in the RAM 20. As described above, these data are obtained by converting the corresponding signals into digital form in the I/O 21.

After this, the operation moves to step 42 wherein discrimination is made as to whether or not the position selected in the selector 12 is "D" position on the basis of the selected position data DS. When DS≠"D", that is, when any position among the "N", "1", "2" and "R" positions is selected by the selecting lever 12a, the determination in step 42 becomes NO and the operation moves to step 43.

In step 43, an automatic gear-shift control operation is carried out in accordance with data DS in such a way that the transmission 5 is shifted to the position corresponding to the selected position represented by the selected position data DS. This automatic gear-shift control operation is carried out by means of the actuators 6 and 11 in accordance with the control signals SF and CS produced from the gear-shifting control unit 17 in the known usual manner. Thus, the execution of the second control program 40 is completed.

The determination in step 42 becomes YES when the "D" position is selected by the selecting lever 12a, and the operation moves to step 44 wherein a suitable gear position for the operation condition of the vehicle at that time is determined as a target gear position. For the performance of this determination, map data for gear shift control, which corresponds to the gear-shaft characteristic shown in FIG. 3, are stored in advance in ROM 19 of the gear-shifting control unit 17.

Figure 3:
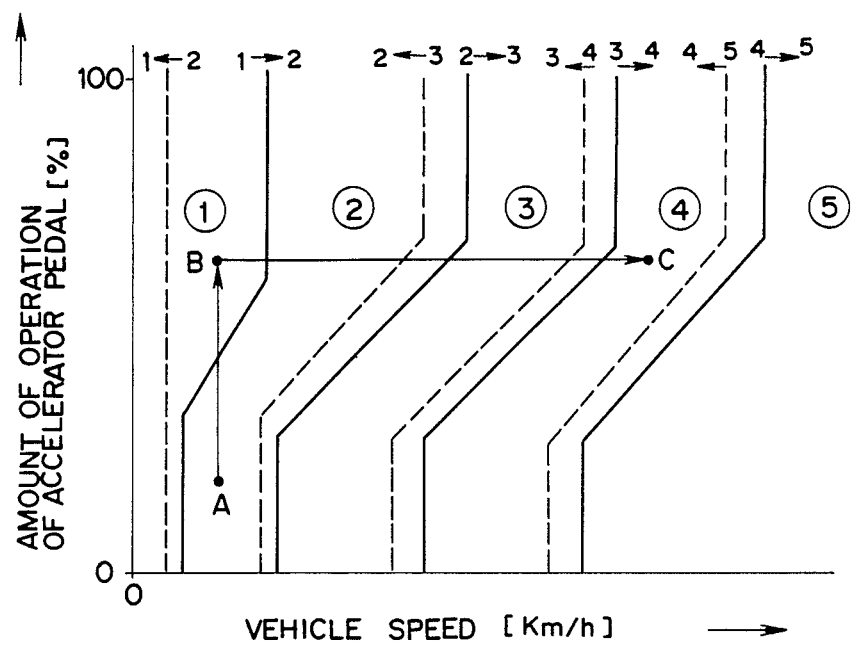
FIG. 3 is a view showing characteristic curves corresponding to map data for gear shift control used in the gear-shifting control unit of FIG. 1.

In the graph of FIG. 3, the vehicle speed is plotted on the abscissas and the amount of operation of the accelerator pedal 15 is plotted on of ordinate. The solid lines indicate the conditions for shift-up operation, and the broken lines indicate the conditions for shift-down operation.

Returning to FIG. 2B, when the "D" position is selected by the selecting lever 12a, the target gear position TG is determined in accordance with the stored map data corresponding to the gear-shift characteristic shown in FIG. 3 on the basis of the acceleration data DA and the vehicle speed data DV stored in step 41.

The operation then moves to step 45 wherein the target gear position TG determined in step 44 is compared in step 45 with an actual gear position AG represented by gear position data DG stored in step 41. When the target gear position TG is higher than the actual gear position AG, that is, a shift-up operation is required to shift to the target gear position TG, the determination is step 45 becomes YES and the operation moves to step 46 wherein a discrimination is made as to whether or not the flag F is in a set condition. When the flag F is in its set condition of, e.g. "1", the execution of the second control program 40 is completed without carrying out the shift-up operation even if a higher gear position than the actual gear position AG is indicated as the target gear position TG.

When the flag F is in a cleared condition of, e.g. "0", the determination in step 46 becomes NO and the operation moves to step 47 wherein the necessary control operation for shifting up the transmission 5 to the target gear position is carried out in accordance with the shift control signal SF and the clutch control signal CS. A set of control signals SF and CS for carrying out the necessary gear-shift up operation are produced from the gear-shifting control unit 17 in a known usual manner. As a result, the transmission 5 is automatically shifted to the target gear position determined in step 44. Thus, the execution of the second control program 40 is terminated.

When the determination in step 45 becomes NO. the operation moves to step 48 wherein the target gear position TG is compared with the actual gear position AG to discriminate whether or not a shift-down operation is required. The determination in step 48 becomes YES when the target gear position TG shows a lower position than the actual gear position AG.

When the determination in step 48 is YES, the operation moves to step 49 wherein the necessary control operation for shifting down to the target gear position determined in step 44 is carried out in accordance with the control signals SF and CL in the usual manner, and the execution of the second control program 40 is completed. That is, the control operation for shifting down is carried out regardless of the condition of the flag F.

In the case where the target gear position TG is equal to the actual gear position AG, the determination in step 48 becomes NO and the execution of the second control program 40 is completed without the performance of the operation for shifting the transmission 5.

With this arrangement, in the case where the vehicle is operated at the operating point A in FIG. 3 and the actual gear position of the transmission 5 is second gear, the automatic transmission system 1 will operate as follows when the operating point A moves to the operating point B on the graph of FIG. 3 in response to the depression of the accelerator pedal 15. Just after the depression of the accelerator pedal 15, the vehicle speed increases little by little and the increase in the vehicle speed is continued until the running load of the vehicle becomes equal to the engine output of the vehicle. Thus, when the operation condition of the vehicle has reached the operating point C at which the running load becomes equal to the engine output of the vehicle, the vehicle will run at a constant speed thereafter.

In this case, the target gear position determined in step 44 is changed from the second gear position to the third gear position, and is further changed from the third gear position to the fourth gear position during shift of the operating point from A to C. However, as the determination in step 33 remains NO and that in step 35 remains YES during this period because the vehicle speed is increasing and the accelerator pedal 15 is not released, the flag F is set just after the accelerator pedal 15 is depressed and the set condition of the flag F is continued. Therefore, the control operation for shifting-up is not carried out irrespective of the fact that a higher gear position than the actual gear position is determined as the target gear position. When the increase in the vehicle speed stops and DV(n) is equal to DV(n−1), the determination in step 35 of the first control grogram 30 becomes NO to clear the flag F in step 34. Thus, at this time point the necessary operation is carried out for automatically shifting up the transmission 5 to the fourth gear position.

As described above, since the gear position is locked at the second gear position until the vehicle speed reaches a speed corresponding to the operating point C, the vehicle can be accelerated effectively. Furthermore, no disengaging operation of the clutch 4 is carried out for lack of a shift-up operation, so that the driver never experiences vehicle deceleration. Therefore, it is possible for the driver to obtain the good acceleration feeling he expected from the operation of the accelerator pedal 15.

Also advantageously, the driver is able to estimate the time of the operation for shifting up beforehand on the basis of the change in the vehicle speed, and is able to decide the time of the shift-up only by manipulation of the acceleration pedal 15.

We claim:

1. An automatic transmission system for vehicles in which a gear type transmission and a clutch associated with a vehicle are operated to perform an automatic gear-shifting operation, said system comprising:
   a first means for producing an acceleration signal indicative of an amount of operation of an acceleration member;
   a second means for producing a vehicle speed signal indicative of a speed of the vehicle;
   a determining means responsive to at least the acceleration signal and the vehicle speed signal for determining a target gear position suitable for an operating condition of the vehicle in accordance with map data for gear-shift control;
   an actuating means responsive to an electric signal for manipulating the gear type transmission and the clutch;
   an acceleration discriminating means for discriminating whether or not the vehicle is in an accelerating state; and
   a control means responsive to said determining means and said acceleration discriminating means for providing said actuating means with necessary control signals for carrying out a gear shift-up operation in accordance with the target gear position determined by said determining means only when it is discriminated by said acceleration discriminating means that the vehicle is not in an accelerating state.

2. A system as claimed in claim 1, wherein said acceleration discriminating means is responsive to the vehicle speed signal and discriminates in accordance with a change in the vehicle speed with the passage of time whether or not the vehicle is in an accelerating state.

3. A system as claimed in claim 1, wherein said control means comprises a detecting means for detecting an actual gear position of the transmission, a comparing means for comparing the result of the detection by the detecting means with the target gear position determined by said determining means, and means responsive to said comparing means and said acceleration discriminating means for supplying the necessary control signals for shifting up to the target gear position to said actuating means only when the vehicle is not in an accelerating state in the case where the target gear position is a higher gear position than the actual gear position.

4. An automatic transmission system for vehicles in which a gear type transmission and a clutch associated with a vehicle are operated to perform an automatic gear-shifting operation, said system comprising;
   a first means for producing an acceleration signal indicative of an amount of operation of an acceleration member;
   a second means for producing a vehicle speed signal indicative of a speed of the vehicle;
   a determining means responsive to at least the acceleration signal and the vehicle speed signal for determining a target gear position suitable for an operating condition of the vehicle in accordance with map data for gear-shift control;
   an actuating means responsive to an electric signal for manipulating the gear type transmission and the clutch;
   an acceleration discriminating means responsive to the vehicle speed signal for discriminating whether or not the vehicle is in an accelerating state;
   a manipulation discriminating means responsive to the acceleration signal for discriminating whether or not the accelerating member is manipulated so as to decelerate the vehicle; and
   a control means responsive to said determining means, said acceleration discriminating means and said manipulation discriminating means for providing said actuating means with necessary control signals for carrying out a gear shift-up operation in accordance with the target gear position determined by said determining means only when it is discriminated by said acceleration discriminating means that the vehicle is not in an accelerating state in the case where the accelerating member is not manipulated so as to decelerate the vehicle.

5. A system as claimed in claim 4, wherein said manipulation discriminating means discriminates whether or not the accelerator member is moved in the direction of deceleration in accordance with the acceleration signal.

6. A system as claimed in claim 4, wherein said control means comprises a detecting means for detecting an actual gear position of the transmission, a comparing means for comparing the result of the detection by the detecting means with the target gear position determined by said determining means, and means responsive to said comparing means, said acceleration discriminating means and said manipulation discriminating means for supplying the necessary control signals for shifting up to the target gear position to said actuating means only when the vehicle is not in an accelerating state and the accelerator member is not manipulated so as to decelerate the vehicle in the case where the target gear position is a higher gear position than the actual gear position.

* * * * *